Sept. 25, 1962 A. BRUNNER 3,055,389
APPARATUS FOR ADJUSTING THE AMOUNT OF A MEDIUM
FLOWING PER TIME UNIT THROUGH A CONDUIT
Original Filed Feb. 16, 1959 2 Sheets-Sheet 1
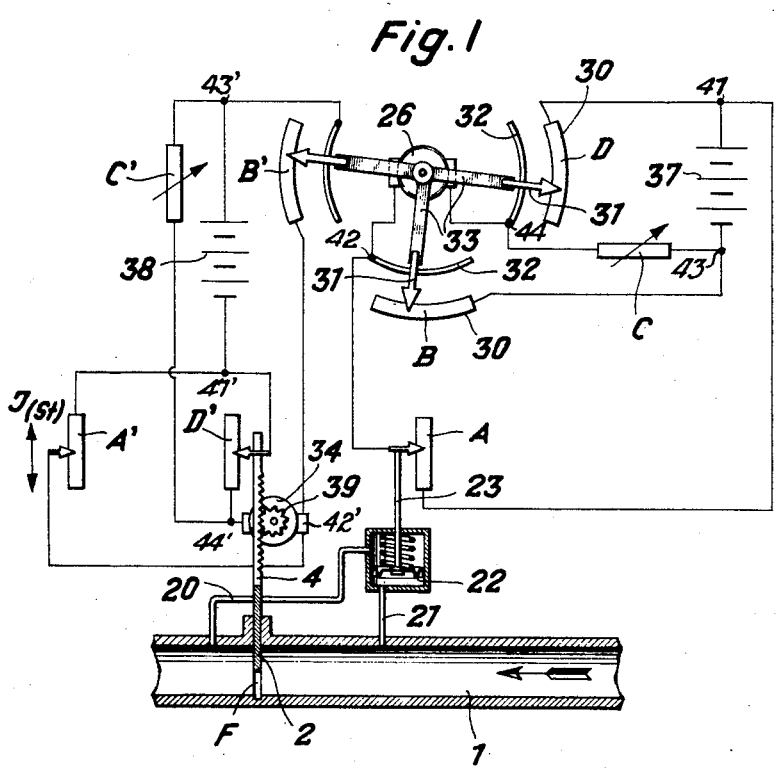
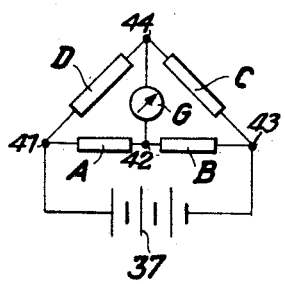
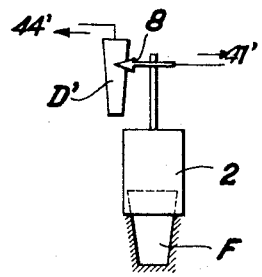
Inventor.
ALFRED BRUNNER.
K.A. Mayr
Attorney.

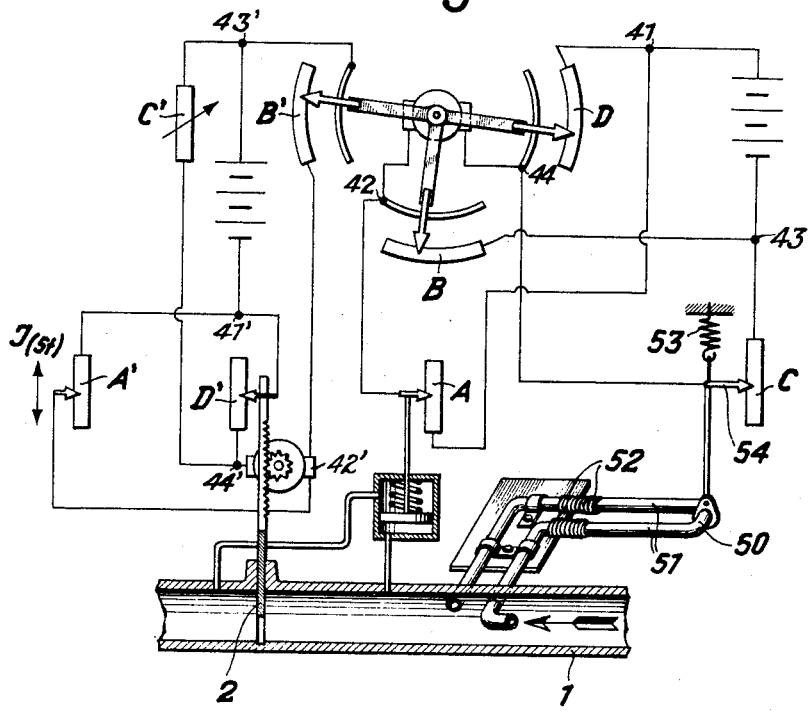

United States Patent Office 3,055,389
Patented Sept. 25, 1962

3,055,389
APPARATUS FOR ADJUSTING THE AMOUNT OF A MEDIUM FLOWING PER TIME UNIT THROUGH A CONDUIT
Alfred Brunner, Winterthur, Switzerland, assignor to Sulzer Freres, S.A., Winterthur, Switzerland, a corporation of Switzerland
Original application Feb. 16, 1959, Ser. No. 793,301. Divided and this application Sept. 14, 1960, Ser. No. 56,056
Claims priority application Switzerland Mar. 3, 1958
3 Claims. (Cl. 137—487)

The present invention relates to an apparatus for adjusting the amount of a medium flowing per time unit through a conduit, the adjustment being proportional to a control signal and being effected by changing or throttling a flow area of the conduit.

The apparatus includes an adjustable throttling element actuated by a motor operator and interposed in a conduit for conducting a medium, the motor operator being operated by a control signal which is modified by a signal which is proportional to the opening of the throttling element and by a signal corresponding to the difference of pressure upstream and downstream of the throttling element.

The problem to control the amount flowing per time unit through a conduit in linear relation to a control signal appears in various engineering fields, for example, in connection with the control of the feedwater supply to steam boilers.

In a conventional system a control signal corresponding to the controlled variable actuates controlling means actuating, for example, a throttle valve for regulating the flow rate of the medium passing through the conduit which flow rate is the manipulated variable. This conventional system has the disadvantage of necessitating measuring means in addition to the throttle valve which measuring means may be in the form of an orifice which produces an additional pressure drop. It is difficult to adjust small flow quantities if the measuring area, i.e. the orifice, is constant, because of the quadratic relation between the pressure drop at the orifice and the flow velocity. If the measuring area or orifice is made small to overcome the last mentioned difficulty, undesired throttling losses occur unless the flow velocities are very small.

In another conventional system an auxiliary throttling element is provided which is so controlled by an auxiliary regulator that the pressure drop across the main regulating valve is constant. If the relation between the flow area and the valve stroke of the main regulating valve is linear, the flow is proportional to the valve stroke. This arrangement functions well, but necessitates two valves. The additional flow energy losses are undesirable in many cases.

It is an object of the present invention to provide an apparatus for controlling the flow of a medium in a conduit which avoids the disadvantages of conventional systems and permits simplification of at least the mechanical devices. In addition, with the system according to the invention the control accuracy is improved and flow resistance is reduced relative to those of conventional control apparatus.

In the system according to the invention the difference $\Delta p$ between the static pressures upstream and downstream of the throttling device is used for actuating a variable resistor forming part of a self-balancing Wheatstone bridge network. This network includes two more variable resistors which are actuated by a balancing motor taking the place of the conventional galvanometer which indicates whether the bridge is balanced or not. The bridge network also includes an adjustable resistor which may be manually adjustable to adjust the proportionality constant of the system to take care of conditions inherent of the system. In apparatus for controlling the rate of flow of fluids whose density varies, the adjustable resistor may be automatically actuated in response to the density of the medium or fluid passing through the conduit in which the throttling device is interposed. The apparatus according to the invention includes a second Wheatstone bridge circuit which includes a variable resistor actuated by a control device representing the desired opening of the throttling device. The second bridge circuit includes a variable resistor which is controlled by the balancing motor of the first bridge. A third variable resistor of the second bridge circuit is actuated in response to a representation of the effective flow area of the throttling device. The fourth resistor of the second bridge is adjustable, for example, for manually adjusting the bridge operation to a condition which is inherent of the system.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

FIG. 1 is a diagrammatic illustration of an apparatus according to the invention.

FIG. 2 illustrates a Wheatstone bridge circuit as used in the apparatus shown in FIG. 1.

FIG. 3 is a diagrammatic illustration of a detail of the apparatus shown in FIG. 1.

FIG. 4 is a diagrammatic illustration of a modification of the apparatus shown in FIG. 1.

In the embodiment of the invention illustrated in FIGURES 1 to 4 of the drawing a medium or fluid whose rate of flow must be regulated is conducted through a pipe 1 including a throttling device or valve 2 which is actuated by a D.-C. power motor 34 and a pinion 39 through a rack rod 4. The pressures downstream and upstream of the device 2 are conducted through pipes 20 and 21 to the sides of a membrane 22 which actuates a rod 23 operating a variable slide resistor A.

The resistor A is part of a self-balancing measuring bridge including resistors A, B, C, D arranged according to FIG. 2. The bridge circuit includes a source of D.-C. current 37 and a galvanometer G. If the resistors A, B, C, D answer the equation $$A:B = D:C \qquad \text{I}$$

the potential is the same in the branch points 42 and 44 and no current flows through the galvanometer G. The bridge circuits in FIG. 1 are the same as shown in FIG. 2 except for the use of a D.-C. balancing motor 26 and a power motor 34 instead of the galvanometer G. The variable resistors B and D individually include a coil 30, a wiper 31 and a contact rail 32. The wipers 31 are connected by means of arms 33 to the shaft of the D.-C. motor 26. The motor 26 moves the wipers of the equal resistors B and D until no current flows through the motor. If the motor 26 is without current the above Equation I applies. Since B and D are equal, the Equation I can also be written $$B = D = \sqrt{A} \cdot \sqrt{C} \qquad \text{II}$$

If the adjustment of the adjustable resistor C is not changed $$B = \text{prop } \sqrt{A} \qquad \text{III}$$

and is therefore proportional to the root of the pressure difference $\Delta p$.

In addition to the wipers 31 the motor 26 also operates a wiper cooperating with resistor B' whose resistance is proportional to the root of the pressure difference $\Delta p$, if there is equilibrium condition. The resistor B' is part of a second bridge circuit which is also self-balancing and includes the resistors A', B', C', D', a source of D.-C. current 38 and the motor 34 driving the pinion 39 which is in engagement with the rack 4 which actuates the throttling device 2 and the slide resistance D'. In the last described bridge circuit A'·C' equals B'·D'. If the slide resistor A' is adjusted proportional to the control signal $J_{(St)}$ for the amount Q flowing through the conduit 1 and if C' is constant $$D' = \text{prop} \frac{Q}{\sqrt{\Delta p}} \cdot k \qquad \text{IV}$$

Care must be taken that the resistance of the resistor D' is proportional to the free flow area F of the orifice of the valve 2. This can be effected by an arrangement as shown in FIG. 3 which shows that, if, for example, the flow area is wedge-shaped, the resistor D' includes a geometrically similar, i.e. wedge-shaped resistance body. This body consists, for example, of a resistance wire which is wound on a spool having a wedge-shaped longitudinal section so that the partial resistance defined by the wiper 8 is always proportional to the effective flow area F, producing the desired function $$Q = \text{prop} \; F \cdot \sqrt{\Delta p} \cdot k \qquad \text{V}$$

Therefore, the flow quantity is always proportional to the value of the control signal $J_{(St)}$ stablished on the resistor A' independently of the pressure difference $\Delta p$ at the valve 2.

In the example illustrated in FIG. 1 it is assumed that the density of the medium whose flow is controlled does not change. The principle underlying the invention can also be used for controlling the flow of media whose density is not constant. In this case the wiper 54 for the adjustable resistor C is provided, for example, with a weighing device 50, shown in FIG. 4, for measuring the density of the medium which weighing device acts either reciprocally or proportionally depending whether the flow of the medium must be controlled according to the volume or according to weight.

In the example shown in FIG. 4 the density weighing device 50 consists of a U-shaped measuring tube 51 through which medium is by-passed. The ends of the U-shaped measuring tube 51 are connected to stationary tubes by means of flexible tubing forming fulcrums 52 for the tube 51 whose weight is counterbalanced by a springs 53. If the density increases, the spring 53 is elongated and if the density decreases, the spring is shortened. If the device acts proportionally, the movement of the measuring tube 51 is directly transmitted to the wiper 54 of the resistor C. The density weighing device 50 shown in FIG. 4 illustrates only the principle of the device by way of example. Any other conventional device may be used without departing from the scope of the invention.

It should be noted that in the apparatus according to the invention the functional relation between the pressure difference $\Delta p$ across the flow control valve and the flow velocity $v$ does not strictly mathematically follow the formula $v = \text{prop} \sqrt{\Delta p}$. The influence of the boundary layer as well as other errors caused by the configuration of the throttle device and other constructive tolerances at various velocities and free flow areas F, for example, turbulence of the flow of the medium which is different at different flow velocities may cause deviations of the quadratic relation between the flow velocities $v$ and $\Delta p$.

The correcting factor $k$ contained in the equations used in the present specification serves for correcting the aforesaid errors, if a strictly linear relation between the control signals $J_{(St)}$ and the adjusted flow is essential.

The present application is a division of my copending application Serial No. 793,301, filed February 16, 1959, now abandoned.

I claim:

1. In a flow control apparatus, a valve having a valve orifice and an adjustable valve member for variably adjusting the effective area of said orifice, pressure differential responsive means associated with said valve and responsive to the pressure difference across said orifice, means responsive to the position of said valve member and affording representation of the effective area of the valve orifice, an electric power motor operatively connected to said valve member for selectively moving said valve member in opening or closing directions, governing means settable for a desired flow rate, a first self-balancing Wheatstone bridge network including a first variable resistor connected to said pressure differential responsive means for actuation thereby, a second variable resistor connected in series with said first variable resistor, a third variable resistor connected in parallel with said first variable resistor and being equal to said second variable resistor, an adjustable resistor connected in series with said third variable resistor and in parallel with said second variable resistor, and an electric balancing motor connected across the junctions of said first and said second variable resistors and of said third variable resistor and said adjustable resistor, said balancing motor being connected to said second and said third variable resistors for equally and simultaneously actuating said second and said third resistors; a second self-balancing Wheatstone bridge network including a first variable resistor connected to said governing means for actuation thereby, a second variable resistor connected in series with said first variable resistor of said second network and connected to said balancing motor for actuation thereby, a third variable resistor connected in parallel with said first variable resistor of said second network and connected to said means which are responsive to the position of said valve member for positioning said third variable resistor by said last mentioned means, and an adjustable resistor connected in series with said third variable resistor and in parallel with said second variable resistor of said second network, said power motor being connected across the junctions of said first and second variable resistors and of said third variable resistor and said adjustable resistor of said second network.

2. In a flow control apparatus as defined in claim 1 and wherein the third variable resistor of said second network includes a resistance body whose resistance is proportional to the effective area of said valve orifice at each position of said last mentioned third variable resistor.

3. In a flow control apparatus as defined in claim 1, a conduit connected to said valve, a device connected to said conduit and responsive to the density of the medium passing through said conduit and through said valve, said device being operatively connected to said adjustable resistor of said first network for adjusting said last mentioned resistor in response to the density of the medium passing through said conduit and said valve.

References Cited in the file of this patent

UNITED STATES PATENTS

| | | |
|---|---|---|
| 2,399,938 | Pett | May 7, 1946 |
| 2,812,481 | Roosdorp | Nov. 5, 1957 |